United States Patent
Lucchi et al.

(12) 
(10) Patent No.: US 6,280,516 B1
(45) Date of Patent: *Aug. 28, 2001

(54) COMPOSITIONS COMPRISING A HYDROCARBONACEOUS MATERIAL

(75) Inventors: Maurizio Lucchi, Ravenna (IT); Theo Al, Leiden (NL); Thomas F. Reed, Alpharetta, GA (US); Robert S. Whitehouse, Lexington, MA (US)

(73) Assignee: Cabot Corporation, Boston, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/758,965

(22) Filed: Dec. 2, 1996

(51) Int. Cl.$^7$ .............................. C08L 95/00; C08L 91/00
(52) U.S. Cl. ................. 106/281.1; 106/248; 106/284.05; 106/476; 106/477; 106/499; 106/502
(58) Field of Search ................ 106/248, 281.1, 106/284.05, 476, 477, 499, 502

(56) References Cited

U.S. PATENT DOCUMENTS

| | | | |
|---|---|---|---|
| 128,680 | * 6/1872 | Tucker | 106/281.1 |
| 361,759 | * 4/1887 | Gilson | 106/248 |
| 912,129 | * 2/1909 | Howe | 106/281.1 |
| 1,304,163 | * 5/1919 | Devlin | 106/248 |
| 1,743,744 | * 1/1930 | Winkelmann | 106/281.1 |
| 2,826,507 | * 3/1958 | Waddill | 106/284.05 |
| 2,960,413 | * 11/1960 | Voet | 106/284.05 |
| 3,528,785 | 9/1970 | Dingus | 23/314 |
| 4,094,697 | 6/1978 | Rostler | 106/280 |
| 4,282,039 | * 8/1981 | Bullough | 106/284.05 |
| 4,837,252 | 6/1989 | Seguin et al. | 523/351 |

FOREIGN PATENT DOCUMENTS

| | | | |
|---|---|---|---|
| 987413 | 4/1976 | (CA) | 400/37 |
| 1 720 168 | 6/1971 | (DE) . | |
| 2 219 147 | 11/1973 | (DE) . | |
| 24 48 936 | 4/1975 | (DE) | C08L/95/00 |
| 0 143 131 | 5/1985 | (EP) | C08J/5/18 |
| 0 471 925 | 2/1992 | (EP) | C08L/95/00 |
| 2537984A1 | 6/1984 | (FR) . | |
| 1 315 968 | 5/1973 | (GB) | C08H/13/10 |
| 80-42783C | 12/1976 | (RU) . | |
| 2 016 018C | 4/1994 | (RU) | C08L/95/00 |
| WO 96/01875 | 1/1996 | (WO) . | |
| WO96/01875 | 1/1996 | (WO) . | |

OTHER PUBLICATIONS

*Kirk–Othmer Encyclopedia of Chemical Technology*, Fourth Ed., vol. 3, pp. 284 et seq.
"Phenolic Resins" by A. Knop and L.A. Pilato, Springer–Verlag, 1985.
"The Chemistry of Phenolic Resins" by R.W. Martin, John Wiley, New York, 1956.
"Calixarenes" by C.D. Gutsche, Royal Society of Chemistry, 1989.
PCT/US97/21554 International Search Report dated Mar. 23, 1998.
PCT Written Opinion filed in PCT/US97/21554 mailed Aug. 25, 1998.
PCT International Preliminary Examination Report filed in PCT/US97/21554 mailed Mar. 10, 1999.
PCT Written Opinion filed PCT/US97/21554 mailed Oct. 2, 1998.

* cited by examiner

*Primary Examiner*—Peter A. Szekely

(57) ABSTRACT

A filler composition comprising a filler material and a hydrocarbonaceous material having a volatility of less than or equal to 5% at 200° and a time of 2 hours. The hydrocarboneous material may comprise a bituminous material comprising bitumen, oxibitumen, or mixtures thereof; petroleum/oil cracker residue bottoms, for example ethylene cracker residues (ECR); carbon black feedstock fuels comprising less than or equal to 5%, by weight, sulfur and having a molar hydrogen to carbon ratio between 0.90:1 and 1.10:1; linear or cyclic condensation products comprising an aromatic alcohol, for example, phenol, catechol, resorcinol, naphthol, and an aldehyde, for example formaldehyde, preferably where the aromatic alcohol is present in a molar excess; or mixtures thereof.

Also disclosed are polymer compositions comprising the filler compositions and polymer compositions comprising a filler material, a hydrocarbonaceous material having a volatility of less than or equal to 5% at 200° and a time of 2 hours, and a polymer. A preferred filler material comprises carbon black, and preferred polymers include ethylene-containing polymers such as ethylene-propylene copolymer or ethylene-propylene terpolymers.

The present invention also includes articles of manufacture incorporating the polymer compositions.

17 Claims, No Drawings

US 6,280,516 B1

COMPOSITIONS COMPRISING A HYDROCARBONACEOUS MATERIAL

FIELD OF THE INVENTION

The present invention relates to a filler composition comprising a filler material and a low volatile hydrocarbonaceous material. The present invention also relates to a polymer composition comprising a filler material, a low volatile hydrocarbonaceous material, and a polymer, and to a polymer composition comprising the filler composition and a polymer.

A preferred filler material comprises carbon black, and preferred polymers include ethylene-containing polymers such as ethylene-propylene copolymer or ethylene-propylene terpolymers.

The present invention further relates to articles of manufacture incorporating the polymer compositions.

BACKGROUND OF THE INVENTION

Asphalt is defined by ASTM as a dark brown to black cementitious material in which the predominating constituents are bitumens that occur in nature or are obtained in petroleum processing. Asphalts characteristically also contain very high molecular weight hydrocarbons called asphaltenes and are essentially soluble in carbon disulfide, and in aromatic and chlorinated hydrocarbons. Bitumen is a generic term defined by ASTM as a class of black or dark-colored (solid, semisolid, or viscous) cementitious substances, natural or manufactured, composed principally of high molecular weight hydrocarbons, of which asphalts, tars, pitches, and asphaltenes are typical. Oxidized bitumen is a generic term for a bitumen which has been oxidized. In Canadian and European practice, and by geologists and archaeologists in the United States, the terms "bitumen" or "asphaltic bitumen" are generally utilized as a synonym for asphalt. In typical commercial procedures, pitches are derived from tars which may be obtained from a destructive distillation of coal, crude oils, and other organic materials. Further details and information relating to bitumens, oxidized bitumens, and asphalts may be found in the published literature, for example in *Kirk-Othmer Encyclopedia of Chemical Technology*, Fourth Edition, Volume 3, pages 284 et seq. (John Wiley and Sons, New York, (1992)).

It is well known, and conventional, to include natural and synthetic rubbers and polymers as filler materials in asphalts or other bituminous materials to produce a class of materials often referred to as "rubber modified bitumens". As implied by its name, the major constituent of a rubber modified bitumen is bituminous. Generally the amount of rubber utilized in a rubber modified bitumen composition is 0.5% to 5%, by weight of the rubber modified bitumen composition.

U.S. Pat. No. 4,837,252 discloses a polymer modified asphalt composition formed by preparing a low asphalt masterbatch comprising 100 parts by weight of ethylene-propylene elastomer, 20 to 50 parts by weight of asphalt, and 10 to 100 parts by weight of a thermoplastic polyolefin. The low asphalt masterbatch may be combined with asphalt to produce a polymer modified asphalt composition which may further include fillers such as chalk, mica, lime, and carbon black in an amount of 10–30%, by weight of the final composition.

The technology of combining aromatic alcohols with aldehydes is also well known. Two sources of information are: "Phenolic Resins" written by A Knop and L A Pilato (Publisher: Springer—Verlag, 1985) also "The Chemistry of Phenolic Resins" written by R W Martin (Publisher: John Wiley, New York,; 1956). Whilst the previous books discuss predominantly linear and highly crosslinked phenolic resin technology, the book "Calixarenes" written by C D Gutsche (Publisher: Royal Society of Chemistry, 1989) reviews the technology of cyclic structures.

Polymer compositions are often utilized in so-called "industrial rubber applications". Industrial rubber applications include automotive and industrial hoses, belts, electrical cable insulation, automotive and industrial weatherstripping, profiles, molded parts, roof sheeting, and the like. Many articles for industrial rubber applications are produced through extrusion techniques, i.e., the polymer composition is extruded through a die, then cooled or chemically hardened.

Fillers are often utilized in polymer compositions to impart desirable characteristics such as reinforcement, pigmentation, and conductivity to the polymer compositions. Carbon blacks have been widely utilized as fillers and reinforcing pigments in the compounding and preparation of polymer compositions. Carbon blacks are generally characterized on the basis of their properties including, but not limited to, their surface areas, surface chemistry, aggregate sizes, and particle sizes. The properties of carbon blacks are analytically determined by tests known to the art, including cetyl-trimethyl ammonium bromide adsorption surface area (CTAB), iodine number ($I_2$No.), dibutyl phthalate adsorption (DBP), and dibutyl phthalate adsorption of the crushed carbon black (CDBP).

Carbon blacks produced by a furnace process generally have bulk densities ranging from 0.02 to 0.1 gram/cubic centimeter (g/cc) and are generally known as fluffy carbon blacks. Fluffy carbon blacks are generally easy to disperse in liquids, and in some polymeric systems. However, fluffy carbon blacks are generally cohesive and, hence, difficult to handle for purposes such as conveying and weighing.

It would be advantageous for use in many polymer systems to have a filler composition comprising a filler material, such as carbon black and a hydrocarbonaceous material, wherein the filler composition was easier to handle for purposes such as conveying, weighing, and processing than typical fluffy carbon blacks.

The physical properties of a polymer composition, including hardness, 100% modulus, elongation to break, energy-to-break, tear strength, electrical resistivity, and others, may be evaluated by tests known in the art. It is advantageous for polymer compositions intended for use in certain industrial rubber applications to have a combination of a high elongation at break property and energy-to-break property, together with a high electrical resistivity. For example, it is advantageous for automotive hoses, such as radiator hoses, to have a high elongation at break and/or energy-to-break property to decrease the tendency of the hose to tear during formation, in particular during mandrel extraction phase after curing. It is also advantageous for automotive hoses to have a level of compound electrical resistivity sufficient to minimize electrochemical degradation, and a tear strength sufficient to minimize tears during usage.

Generally an increase in the elongation at break property of a polymer composition will correspond to a decrease in the 100% modulus of the composition. This relationship between the elongation at break property and 100% modulus property of a polymer composition is often discussed in terms of an "(elongation at break)×(100% modulus) factor". In heretofore conventional radiator hoses comprising peroxide cured EPDM compositions, the (elongation at break)× (100% modulus) factor is generally 900–1000 MegaPascals percent, commonly abbreviated as MPa %. MPa, or MegaPascals refers to thousands of Pascals (1000×Pa).

Higher values of MPa % are generally advantageous, therefore it would be advantageous to have a polymer composition, suitable for use in industrial rubber applications having an (elongation at break)×(100% modulus) factor above 1100 MPa %.

The elongation at break property of a polymer composition is often re-measured after the polymer composition has aged in oil at an elevated temperature. It would be advantageous to have a polymer composition, suitable for use in industrial rubber applications having an elongation in break after aging which is greater than 200%.

These and other advantages may be realized by the present invention. The present invention relates to compositions comprising a filler material, hydrocarbonaceous material and a polymer wherein the amount of polymer is greater, in terms of percent by weight, and the amount of hydrocarbonaceous material is less, in terms of percent by weight, than the corresponding amounts in a rubber modified bitumen composition. Thus, the compositions of the present invention, and the articles of manufacture comprising the compositions, are distinguishable from prior art rubber modified bitumens. As utilized herein "polymer" refers broadly to any natural rubber, synthetic rubber, elastomer, and/or blends or mixtures thereof.

SUMMARY OF THE INVENTION

The present invention comprises filler compositions that in their dry form have improved handling characteristics and that impart enhanced performance characteristics to polymer compositions. The filler compositions comprise:

99.9 to 50.0 parts by weight of a filler material, and 0.1 to 50.0 parts by weight of a hydrocarbonaceous material having a volatility of less than or equal to 5% at 200° and a time of 2 hours.

Suitable hydrocarbonaceous materials comprise: bituminous materials comprising bitumen; oxidized bitumen (oxibitumen) or mixtures thereof; petroleum/oil cracker residue bottoms;

carbon black feedstock fuels comprising less than or equal to 5%, by weight, sulfur and having a molar hydrogen to carbon ratio between 0.90:1 and 1.10:1; linear or cyclic condensation products comprising an aromatic alcohol and an aldehyde; or mixtures thereof.

The filler composition may further comprise 0 to 50.0 parts by weight of an oil. Preferred filler materials for use in the filler composition of the present invention include, carbonaceous filler materials such as carbon black and graphite, metal oxides, and metal oxide-carbon black composites comprising silica.

The filler compositions of the present invention have advantageous conveying, weighing and processing characteristics.

The filler compositions may be produced by any means known in the art. For example, in the case of a carbon black filler material, the carbon black and the hydrocarbonaceous material may be produced by blending fluffy carbon black with the hydrocarbonaceous material in a liquid form, preferably at high temperature, to form low dust, attrition resistant pellets. Alternatively, the hydrocarbonaceous material may be converted into an aqueous emulsion prior to combining with the fluffy carbon black; the resulting wet pellet is then dried under temperature and time conditions such that the water is removed without any decomposition of the hydrocarbonaceous material.

In addition, the present invention provides polymer compositions and articles of manufacture which achieve the advantages set forth above as well as other advantages.

An embodiment of a polymer composition of the present invention comprises:

100 parts by weight of a polymer, preferably an ethylene-containing polymer;

1 to 800 parts by weight, per 100 parts by weight of the ethylene-containing polymer (1 to 800 parts per hundred parts of rubber, commonly abbreviated as phr) of a filler composition of the present invention; and 0.0 to 160, preferably 5 to 160, parts by weight, per 100 parts by weight of the ethylene-containing polymer (0 to 160 phr) of an oil.

Another embodiment of a polymer composition of the present invention comprises:

100 parts by weight of a polymer, preferably an ethylene-containing polymer;

50 to 250 parts by weight, per 100 parts by weight of the ethylene-containing polymer (50 to 250 phr) of a filler material;

0.5 to 50 parts by weight, per 100 parts by weight of the ethylene-containing polymer (0.5 to 50 phr) of a hydrocarbonaceous material having a volatility less than or equal to 5% at 200° and a time of 2 hours; and 0.0 to 160, preferably 5 to 160, parts by weight, per 100 parts by weight of the ethylene-containing polymer (0 to 160 phr) an oil.

Suitable low volatile hydrocarbonaceous materials comprise: bituminous materials comprising bitumen; oxidized bitumen (oxibitumen;) or mixtures thereof; petroleum/oil cracker residue bottoms; carbon black feedstock fuels comprising less than or equal to 5%, by weight, sulfur and having a molar hydrogen to carbon ratio between 0.90:1 and 1.10:1; linear or cyclic condensation products comprising an aromatic alcohol and an aldehyde; or mixtures thereof.

Preferably the ethylene-containing polymer, in the embodiments of a polymer composition according to the present invention, comprises: an ethylene-propylene copolymer or an ethylene-propylene terpolymer. More preferably, the ethylene-containing polymer comprises ethylene propylene diene monomer (EPDM). Preferably the hydrocarbonaceous material has low volatility.

A preferred filler material comprises a carbonaceous material, more preferably a carbon black.

A preferred oil comprises a hydrocarbonaceous oil, for example an oil utilized in the pelletizing of carbon blacks.

As used herein "polymer" refers broadly to any natural rubber, synthetic rubber, elastomer, and/or blends or mixtures thereof.

The present invention also includes an article of manufacture produced utilizing a polymer composition of the present invention. The article of manufacture may comprise an extruded article, including a profile, tube, tape, or film; a hose; a belt; roofing sheet; or a molded article. A preferred article of manufacture is an automotive hose.

Advantages of the polymer compositions of the present invention include one or more of the following:

the polymer composition has a greater elongation to break;

the polymer composition has an increased (elongation to break)×(100% modulus) factor;

the polymer composition has an improved elongation to break after aging property;

the polymer composition has an improved tear and hot tear resistance;

the polymer composition has an improved (greater) energy-to-break;

the polymer composition has sufficient electrical resistivity to resist degradation in automotive applications; and the polymer composition has sufficient hardness for automotive applications.

The articles of manufacture of the present invention are advantageous for similar reasons.

Further details and advantages of the present invention are set forth in the following more detailed description.

DETAILED DESCRIPTION OF THE INVENTION

According to an aspect of the present invention, a filler composition comprises:

99.9 to 50.0 parts by weight of a filler material, 0.1 to 50.0 parts by weight, preferably 0.5 to 50.0 parts by weight, more preferably 0.5 to 20.0 parts by weight, of a hydrocarbonaceous material having a volatility of less than or equal to 5% at 200° and a time of 2 hours; and 0 to 50.0 parts by weight of an oil.

Hydrocarbonaceous materials having a volatility less than or equal to 5% after being heated from 25° C. to 200° C. at 20° C./minute in a nitrogen atmosphere include, but are not limited to:

bituminous materials comprising bitumen; oxidized bitumen (oxibitumen); or mixtures thereof;

petroleum/oil cracker residue bottoms, for example ethylene cracker residues (ECR);

carbon black feedstock fuels comprising less than or equal to 5%, by weight, sulfur and having a molar hydrogen to carbon ratio between 0.90:1 and 1.10:1; and linear or cyclic condensation products comprising an aromatic alcohol, for example phenol, catechol, resorcinol, naphthol; and an aldehyde, for example, formaldehyde; preferably where the aromatic alcohol is present in a molar excess.

The volatility of the hydrocarbonaceous material may be measured by using thermogravimetric analysis (TGA). As utilized herein, a "low volatile hydrocarbonaceous material" or "low volatility hydrocarbonaceous material" refers to a hydrocarbonaceous material having a loss in mass of less than 5% after a 10–20 mg sample of the material has been heated from 25° C. to 200° C. at 20° C./minute in a nitrogen atmosphere, flow rate 40–60 cc/minute.

Suitable filler materials for use in the filler composition of the present invention include, but are not limited to, carbonaceous filler materials such as carbon black, activated carbons, and carbon composite materials including metal oxide-carbon composites. A preferred filler material comprises a carbonaceous material, more preferably a carbon black. The carbon black may be any carbon black such as a furnace carbon black, a thermal carbon black, an acetylene black, and a carbon black produced by a gasification process. Suitable carbon blacks include carbon blacks having an $I_2$ No. of 10–1500 mg/g and a DBP of 30–250 cc/100 g.

Bitumen is utilized herein in a manner consistent with its meaning to those of ordinary skill in the art as set forth above. Oxibitumen, or oxidized bitumen, is bitumen which has been heated to a fluid consistency and had air blown through it for a period of time. Bitumen and oxidized bitumen are each characterized by their properties, for example, softening temperature, penetration, and hardness.

Carbon black feedstock fuels refers to hydrocarbonaceous fuels comprising unsaturated hydrocarbons such as acetylene; olefins such as ethylene, propylene, butylene; aromatics such as benzene, toluene, and xylene; certain saturated hydrocarbons; and other hydrocarbons such as kerosenes, naphthalenes, terpenes, ethylene tars, aromatic cycle stocks, and the like.

Petroleum/oil cracker residue bottoms refers to hydrocarbonaceous material fraction which has the least volatility and remains as a residue in the distillation process. Typically this material is characterised by having a carbon to hydrogen ratio equal to or less than 1.1:1.

Suitable oils for use in an embodiment of the filler composition of the present invention include oils conventionally utilized in pelletizing operations, and the following oils: aromatic oils, naphthenic oils, hydrogenated naphthenic oils, paraffinic oils, vegetable oils and/or mixtures thereof.

An embodiment of a polymer composition of the present invention comprises:

100 parts by weight of a polymer, preferably an ethylene-containing polymer;

1 to 800 parts by weight, per 100 parts by weight of the ethylene-containing polymer (1 to 800 phr) of a filler composition of the present invention; and 0.0 to 160, preferably 5 to 160, parts by weight, per 100 parts by weight of the ethylene-containing polymer (0 to 160 phr) of an oil.

Another embodiment of a polymer composition of the present invention comprises:

100 parts by weight of a polymer, preferably an ethylene-containing polymer;

50 to 250 parts by weight, per 100 parts by weight of the ethylene-containing polymer (50 to 250 phr) of a filler material;

0.5 to 50 parts by weight, preferably 0.5 to 20 parts by weight, per 100 parts by weight of the ethylene-containing polymer (0.5 to 50 phr, preferably 0.5 to 20 phr) of a hydrocarbonaceous material having a volatility of less than or equal to 5% at 200° and a time of 2 hours; and 0.0 to 160, preferably 5 to 160, parts by weight, per 100 parts by weight of the ethylene-containing polymer (0 to 160 phr) of an oil.

Hydrocarbonaceous materials having a volatility less than or equal to 5% at 200° and a time of 2 hours suitable for use in a polymer composition of the present invention include the hydrocarbonaceous materials set forth above.

A polymer composition of the present invention may include other conventional additives such as coagents, additional filler materials, processing additives, hydrocarbonaceous oils, stabilizers, accelerators, antioxidants, curing agents, vinyl silane, and the like. Preferably the composition is curable. Preferred curing agents are organic peroxides; and sulfur, sulfur donor systems, or mixtures thereof.

Suitable filler material components and hydrocarbonaceous material components for use in a polymer composition of the present invention include those described above with reference to the filler composition of the present invention. A preferred filler material is a carbon black. Suitable carbon blacks include carbon blacks having an $I_2$ No. of 10–1500 mg/g and a DBP of 30–250 cc/100 g. For polymer compositions of the present invention intended for use in automotive applications, such as automotive hoses, it is preferred to use a carbon black which will impart a high electrical resistivity to the composition. Preferred carbon blacks for these applications include carbon blacks having the following combination of analytical properties:

an $I_2$ No. of 10–150, preferably 10–60 mg/g and more preferably 15–35 mg/g;

a DBP of 40–150 cc/100 g, preferably 80–130 cc/100 g.

Among the polymers suitable for use with the present invention are natural rubber, synthetic rubber, e.g. polyisoprene and polybutadiene, and their derivatives such as chlorinated rubber; copolymers of styrene butadiene comprising from about 10 to about 70 percent by weight of styrene and from about 90 to about 30 percent by weight of butadiene, such as, copolymer of 19 parts styrene and 81 parts butadiene, a copolymer of 30 parts styrene and 70 parts butadiene, a copolymer of 43 parts styrene and 57 parts butadiene, and a copolymer of 50 parts styrene and 50 parts butadiene; polymers and copolymers of conjugated dienes, such as polybutadiene, polyisoprene, polychloroprene, and the like; and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alpha-methylene carboxylic acids, and the esters and amides thereof, such as acrylic acid and dialkylacrylic acid amide. Additional polymeric compositions are polyolefins such as polypropylene and polyethylene. Suitable polymers also include:

a) propylene homopolymers, ethylene homopolymers, and ethylene copolymers and graft polymers where the co-monomers are selected from butene, hexene, propene, octene, vinyl acetate, acrylic acid, methacrylic acid, $C_1$–$C_8$ alkyl esters of acrylic acid, $C_1$–$C_8$ alkyl esters of methacrylic acid, maleic anhydride, half ester of maleic anhydride, and carbon monoxide;

b) elastomers selected from natural rubber, polybutadiene, polyisoprene, random or block styrene butadiene rubber (SBR), polychloroprene, acrylonitrile butadiene, ethylene propylene co and terpolymers, ethylene propylene diene monomer (EPDM); and c) homopolymers and copolymers of styrene, including styrene—butadiene—styrene linear and radial polymer, acrylonitrile butadiene styrene (ABS), and styrene acrylonitrile (SAN).

Elastomeric compositions also include vulcanized compositions (VR), thermoplastic vulcanizates (TPV), thermoplastic elastomers (TPE) and thermoplastic polyolefins (TPO). TPV, TPE, and TPO materials are further classified by their ability to be extruded and molded several times without loss of performance characteristics.

Preferred for use herein are ethylene-containing polymers including copolymers of ethylene and other high alpha olefins such as propylene, butene-1, and pentene- 1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene, and norbornene. Preferably the third monomer is present in an amount from 0.5 to 10 percent by weight. Examples of ethylene-containing polymers suitable for use in the composition of the present invention include, but are not limited to, EPDM. Preferably the ethylene-containing polymer comprises: an ethylene-propylene copolymer or an ethylene-propylene terpolymer. More preferably, the ethylene-containing polymer comprises EPDM. Also preferred is an ethylene-containing polymer comprising 0.5 to 98%, by weight, of ethylene monomer.

An embodiment of a polymer composition of the present invention comprising a filler composition of the present invention may be produced by premixing the filler material with the hydrocarbonaceous material and then physically mixing the resulting filler composition and the polymer. A carbon black/hydrocarbon material filler composition suitable for use in the compositions of the present invention may be produced in any manner known in the art, such as by physically blending the components, melt mixing the components, or combining the components while pelletizing the filler. The carbon black/hydrocarbonaceous material may be produced, in dry form, by a conventional pelletizing process. For example, carbon black/hydrocarbonaceous material for use in the compositions of the present invention may be produced by contacting a filler, e.g. a fluffy carbon black, in a pin pelletizer with a dispersion containing a low volatility hydrocarbonaceous material as specified in the description of the present invention, and optionally with dispersion stabilizers, to form wet pellets and then heating the wet pellets under controlled temperature and time parameters such that the liquid is removed from the pellets without the treating agent undergoing substantial decomposition of either the low volatility hydrocarbonaceous material or carbon black.

Alternatively pellets may be formed by contacting the fluffy carbon black with low volatility hydrocarbonaceous material in liquid form, preferably as a hot mobile liquid, in a pin pelletizer to form pellets. Preferably the low volatile hydrocarbonaceous material is applied to the carbon surface in an atomized form. To allow for optimum atomization, the low volatile hydrocarbonaceous material may be combined with a volatile or non-volatile diluent, for example a hydrocarbonaceous oil.

Pin pelletizers which may be utilized to produce material for use in compositions of the present invention are known in the art and include the pin pelletizer described in U.S. Pat. No. 3,528,785, the disclosure of which is hereby incorporated by reference. U.S. Pat. No. 3,528,785 also describes a conventional pelletizing process which may be utilized to produce material for use in the compositions of the present invention. In addition, WO 96/01875 discloses a process which may be utilized to produce material for use in the compositions of the present invention.

Another embodiment of a polymer composition of the present invention may be produced by physically mixing the polymer, filler, and bituminous material in any manner known to the art for combining polymers and particulate components. A preferred method for producing a polymer composition of the present invention is compounding using a batch or continuous mixer such as a Banbury mixer, Twin Screw extruder, or Buss kneader. The compositions of the present invention may be cured in manners conventional in the art.

The present invention also includes an article of manufacture produced utilizing a polymer composition of the present invention. The article of manufacture may comprise an extruded article, such as a profile, tube, tape, or film. The article of manufacture may also comprise a hose; a belt; roofing sheet; or a molded article. The articles of manufacture of the present invention may be produced using conventional techniques utilized by those of ordinary skill in the art. A preferred article of manufacture of the present invention is an automotive hose.

The effectiveness and advantages of various aspects and embodiments of the present invention will be further illustrated by the following examples wherein the following testing procedures were utilized.

The following testing procedures were utilized in the determination and evaluation of the analytical properties of the carbon blacks utilized in the following examples. The DBP (dibutyl phthalate adsorption value) of the carbon blacks utilized in the examples, expressed as cubic centimeters DBP per 100 grams carbon black (cc/100 g), was determined according to the procedure set forth in ASTM Test Procedure D2414. The Iodine number ($I_2$No.) of the carbon blacks utilized in the examples, expressed as milligrams per gram (mg/g), was determined according to ASTM Test Procedure D1510. The cetyl-trimethyl ammonium bromide adsorption surface area (CTAB) of the carbon blacks was determined according to ASTM Test Procedure D3765-85. The dibutyl phthalate adsorption of the crushed carbon black (CDBP) of the carbon black pellets was determined according to the procedure set forth in ASTM Test Procedure D3493-86.

The modulus, tensile strength and elongation of the polymer compositions were measured by the procedure set forth in ASTM Test Procedure D412.

Oil ageing of the polymer compositions was undertaken utilizing the following conditions. Specimens were immersed in ASTM oil number 2 for a period of 22 hours at 100° C. The specimens were removed from the oil and allowed to cool to room temperature. Excess surface oil was wiped from the surface of the specimens before the specimens were subjected to further testing.

The Shore A Hardness of the polymer compositions was determined according to the procedure set forth in ASTM Test Procedure D-2240-86.

Tear strength of the polymer compositions was determined according to the procedure set forth in ASTM Test Procedure D24 using the nicked crescent tear Die B sample geometry.

The volatility of the hydrocarbonaceous material may be measured by using thermogravimetric analysis (TGA). As utilized herein, a "low volatile hydrocarbonaceous material" or "low volatility hydrocarbonaceous material" refers to a hydrocarbonaceous material having a loss in mass of less than 5% after a 10–20 mg sample of the material has been heated from 25° C. to 200° C. at 20° C./minute in a nitrogen atmosphere, flow rate 40–60 cc/minute.

EXAMPLE 1

This example illustrates a process for preparing polymer compositions of the present invention and the advantages of the polymer compositions of the present invention.

Seven polymer compositions were prepared utilizing the ingredients listed in Table 1 below. Polymer Composition 1 was a control composition. Polymer Compositions 2–7 were polymer compositions of the present invention. The carbon black utilized had the following analytical characteristics: a CTAB of 23 $m^2$/g; an Iodine number ($I_2$No.) of 19 mg/g; and a DBP of 90 cc/100 g.

TABLE 1

| Ingredient %, by weight | Polymer Comp. 1 | Polymer Comp. 2 | Polymer Comp. 3 | Polymer Comp. 4 | Polymer Comp. 5 | Polymer Comp. 6 | Polymer Comp. 7 |
| --- | --- | --- | --- | --- | --- | --- | --- |
| Vistalon 7500 | 70 | 70 | 70 | 70 | 70 | 70 | 70 |
| Vistalon 3666 | 52.5 | 52.5 | 52.5 | 52.5 | 52.5 | 52.5 | 52.5 |
| Sunpar 2280oil | 22.5 | 22.5 | 22.5 | 22.5 | 22.5 | 22.5 | 22.5 |
| Permanax TQ | 1 | 1 | 1 | 1 | 1 | 1 | 1 |
| Maglite D | 5 | 5 | 5 | 5 | 5 | 5 | 5 |
| Aktigan | 4 | 4 | 4 | 4 | 4 | 4 | 4 |
| Carbon Black | 110 | 110 | 110 | 110 | 110 | 110 | 110 |
| Shell 85/25 | 0 | 10 | 15 | 0 | 0 | 0 | 0 |
| Shell 100/40 | 0 | 0 | 0 | 10 | 15 | 0 | 0 |
| Repsol 110/15 | 0 | 0 | 0 | 0 | 0 | 10 | 15 |
| Perkadox 14/40 | 8 | 8 | 8 | 8 | 8 | 8 | 8 |

Polymer Comp.=polymer composition
Vistalon 7500 and Vistalon 3666 are EPDM and oil extended (43% oil) EPDM rubbers obtained from Exxon Chemical Co.
Sunpar 2280 is a heavy paraffinic oil manufactured and sold by Sun Chemical Corp.
Maglite D is a magnesium oxide manufactured and sold by Marine Magnesium Co.
Aktigan is a peroxide accelerator manufactured and sold by Kettlitz Chemical Co.
Permanex TQ is an antidegredant manufactured and sold by Rhone Poulenc.
Shell 85/25 is a bitumen supplied by Shell Chemical Co.
Shell 100/40 is a bitumen supplied by Shell Chemical Co.
Repsol 110/15 is a bitumen supplied by Repsol Chemical.
Perkadox is an organic peroxide manufactured and sold by Akzo Nobel Chemicals Inc.

The compositions described in Table 1 were prepared by adding all the ingredients, with the exception of the Perkadox, to a Banbury mixer operating with a rotor speed of 77 rpm. The body of the Banbury mixer was maintained at 30° C. using external cooling water and a 70% fill factor was used to obtain optimum mixing of the components. After mixing for 3.5 minutes the material was removed from the Banbury and transferred to a cold (400° C. roll temperature) two-roll mill where the Perkadox organic peroxide was added. The compound was mixed for 7 minutes to ensure uniform dispersion of the peroxide, before being removed as a sheet and cured in a press for 20 minutes at 170° C.

After curing, the properties of the polymer compositions were evaluated utilizing the test procedures described above. The results are reported in Table 2 below.

TABLE 2

| Test | Polymer Comp. 1 | Polymer Comp. 2 | Polymer Comp. 3 | Polymer Comp. 4 | Polymer Comp. 5 | Polymer Comp. 6 | Polymer Comp. 7 |
|---|---|---|---|---|---|---|---|
| Crescent Tear Strength | | | | | | | |
| 23° C. N/mm | 36 | 45 | 43 | 41 | 40 | 43 | 44 |
| 100° C. N/mm | 12 | 15 | 18 | 14 | 15 | 14 | 15 |
| Tensile results | | | | | | | |
| Strength RT, MPa | 14.4 | 13.1 | 11.9 | 13.4 | 12.3 | 13.1 | 11.8 |
| Elongation RT, % | 218 | 340 | 373 | 300 | 373 | 324 | 416 |
| 100% Modulus RT, MPa | 5.1 | 3.5 | 3.1 | 3.9 | 3.0 | 3.9 | 3.0 |
| 200% Modulus RT, MPa | 12.7 | 7.7 | 6.7 | 8.2 | 6.8 | 8.0 | 6.4 |
| Strength Oil, MPa | 9.7 | 8.1 | 7.2 | 8.4 | 7.8 | 8.1 | 7.1 |
| Elongation Oil, % | 185 | 213 | 249 | 211 | 258 | 262 | 285 |
| Modulus Oil, 100% | 5.4 | 3.4 | 3.1 | 4.8 | 3.4 | 3.0 | 2.9 |

N = Newton, MPa = 1000 Pascal, RT = Room Temperature (approximately 23° C.).

In coolant hose applications the product of the 100% modulus and the elongation at break is used to predict durability with higher figures being desirable. As shown below in Table 3, the values for the polymer compositions of the present invention, Polymer Compositions 2–7, are higher than the control composition, Polymer Composition 1.

TABLE 3

| | Polymer Comp. 1 | Polymer Comp. 2 | Polymer Comp. 3 | Polymer Comp. 4 | Polymer Comp. 5 | Polymer Comp. 6 | Polymer Comp. 7 |
|---|---|---|---|---|---|---|---|
| [Elongation at break] × [100% Modulus] | 1112 | 1190 | 1156 | 1176 | 1179 | 1264 | 1248 |

Example 2

This example illustrates a process for preparing polymer compositions of the present invention utilizing a filler composition of the present invention and the advantages of the polymer compositions of the present invention.

Six polymer compositions (8–13) were prepared utilizing the ingredients listed in Table 4 below. Polymer Composition 8 was a control composition. Polymer Compositions 9–13 were polymer compositions of the present invention.

TABLE 4

| | Polymer Comp. 8 | Polymer Comp. 9 | Polymer Comp. 10 | Polymer Comp. 11 | Polymer Comp. 12 | Polymer Comp. 13 |
|---|---|---|---|---|---|---|
| Vistalon 7500 | 70 | 70 | 70 | 70 | 70 | 70 |
| Vistalon 3666 | 52.5 | 52.5 | 52.5 | 52.5 | 52.5 | 52.5 |

TABLE 4-continued

|  | Polymer Comp. 8 | Polymer Comp. 9 | Polymer Comp. 10 | Polymer Comp. 11 | Polymer Comp. 12 | Polymer Comp. 13 |
| --- | --- | --- | --- | --- | --- | --- |
| Sunpar oil 2280 | 22.5 | 22.5 | 22.5 | 22.5 | 22.5 | 22.5 |
| Permanax TQ | 1 | 1 | 1 | 1 | 1 | 1 |
| Maglite D | 5 | 5 | 5 | 5 | 5 | 5 |
| Aktigan | 4 | 4 | 4 | 4 | 4 | 4 |
| CB2 | 110 | 110 | 110 | 110 | 110 | 110 |
| Ergon AC30 | 0 | 10 | 0 | 0 | 0 | 0 |
| Ergon CSQ1H | 0 | 0 | 6 | 12 | 0 | 0 |
| Ergon CSS1HA | 0 | 0 | 0 | 0 | 6 | 12 |
| Perkadox 14/40 | 8 | 8 | 8 | 8 | 8 | 8 |

Polymer Comp.=polymer composition
CB 2=carbon black having the following characteristics: CTAB of 22 $m^2/g$; $I_2$No. of 20 mg/g; and DBP of 93 cc/100 g
Vistalon 7500 and Vistalon 3666 are EPDM and oil extended (43% oil) EPDM rubbers obtained from Exxon Chemical Co.
Sunpar 2280 is a heavy paraffinic oil manufactured and sold by Sun Chemical Corp.
Maglite D is a magnesium oxide manufactured and sold by Marine Magnesium Co.
Aktigan is a peroxide accelerator manufactured and sold by Kettlitz Chemical Co. in Germany.
Permanex TQ is an antidegradant manufactured and sold by Rhone Poulenc.
Ergon AC30 is a bitumen manufactured and sold by Ergon Asphalt & Emulsions Inc. Ergon AC30 solid bitumen component has a volatility of 1.2% after being heated from 25° C. to 200° C. at a rate of 20° C./minute in a nitrogen gas atmosphere having a flow rate of 55 cc/minute.
Ergon CSQ1H and CSS1HA are bitumen emulsified in water (approx. 60% bitumen content), also from Ergon Asphalt & Emulsions Inc. The solid component of Ergon CSQ1H emulsified bitumen has a volatility of 1.8% after being heated from 25° C. to 200° C. at a rate of 20° C./minute in a nitrogen gas atmosphere having a flow rate of 55 cc/minute. The solid component of Ergon CSS1HA emulsified bitumen has a volatility of 2.15% after being heated from 25° C. to 200° C. at a rate of 20° C./minute in a nitrogen gas atmosphere having a flow rate of 55 cc/minute.
Perkadox is an organic peroxide manufactured and sold by Akzo Nobel Chemicals Inc.

Polymer compositions 8 and 9 were produced in the manner described in Example 1. Polymer Compositions 10–13 were produced by combining the bitumen with the fluffy carbon back (CB2) in a pin pelletizer; sufficient extra water was added to produce round uniform pellets having a mean particle size diameter between 1 mm and 2 mm. The wet pellets were then dried in an air circulating oven held at 125° C. until the moisture content of the pellet was reduced to below 0.5%. These pellets were then combined with the other ingredients in the manner described in Example 1. The amounts in the Table 4 reflect the amounts of solid bitumen in the formulation and not emulsion.

After curing, the elongation at break and 100% modulus properties of the polymer compositions were evaluated utilizing the test procedures described above. In coolant hose applications the product of the 100% modulus and the elongation at break is used to predict durability, and a higher figure is desirable. As shown below in Table 5, the values for the polymer compositions of the present invention, Polymer Compositions 9–13, are higher than the control composition, Polymer Composition 8.

TABLE 5

|  | Polymer Comp. 8 | Polymer Comp. 9 | Polymer Comp. 10 | Polymer Comp. 11 | Polymer Comp. 12 | Polymer Comp. 13 |
| --- | --- | --- | --- | --- | --- | --- |
| [Elongation at break] × [100% Modulus] | 1063 | 1178 | 1180 | 1149 | 1186 | 1178 |

The data presented in Table 5 illustrates the improvement in the product of elongation at break and 100% modulus from bitumen either added directly during polymer composition formulation or pre-combined with carbon black to form a filler composition of the present invention which is then combined with the polymer.

EXAMPLE 3

This example illustrates a process for preparing polymer compositions of the present invention utilizing a filler composition of the present invention and the advantages of the polymer compositions of the present invention utilizing the ingredients listed in Table 6 below. The oil and bitumen components were varied to maintain constant hardness. Polymer Composition 14 was a control composition. Polymer Compositions 15–19 were polymer compositions of the present invention.

TABLE 6

|  | Polymer Comp. 14 | Polymer Comp. 15 | Polymer Comp. 16 | Polymer Comp. 17 | Polymer Comp. 18 | Polymer Comp. 19 |
|---|---|---|---|---|---|---|
| Vistalon 7500 | 70 | 70 | 70 | 70 | 70 | 70 |
| Vistalon 3666 | 52.5 | 52.5 | 52.5 | 52.5 | 52.5 | 52.5 |
| Sunpar oil 2280 | 33.5 | 28.5 | 23.5 | 28.5 | 23.5 | 33 |
| Permanax TQ | 1 | 1 | 1 | 1 | 1 | 1 |
| Maglite D | 5 | 5 | 5 | 5 | 5 | 5 |
| Aktigan | 4 | 4 | 4 | 4 | 4 | 4 |
| CB3 | 110 | 110 | 110 | 110 | 110 | 110 |
| Bitumen 80/100 | 0 | 5 | 10 | 0 | 0 | 0 |
| Koch SS-1H | 0 | 0 | 0 | 5 | 10 | 2 |
| Ergon CSS1HA | 0 | 0 | 0 | 0 | 6 | 12 |
| Perkadox 14/40 | 8 | 8 | 8 | 8 | 8 | 8 |

Polymer Comp.=polymer composition
CB 3=carbon black having the following fluffy characteristics: CTAB of 22 $m^2/g$; $I_2$No. of 22 mg/g; and DBP of 107 cc/100 g
Vistalon 7500 and Vistalon 3666 are EPDM and oil extended (43% oil) EPDM rubbers obtained from Exxon Chemical Co.
Sunpar 2280 is a heavy paraffinic oil manufactured and sold by Sun Chemical Corp.
Maglite D is a magnesium oxide manufactured and sold by marine Magnesium Co.
Bitumen 80/100 is a bitumen manufactured and sold by Shell Chemicals Co.
Aktigan is a peroxide accelerator manufactured and sold by Kettlitz Chemical Co in Germany.
Permanex TQ is an antidegradant manufactured and sold by Rhone Poulenc.
Koch SS-1H is an anionic bitumen emulsion supplied by Koch Materials Co. Koch SS-1H bitumen has a volatility of 2.5% after being heated from 25° C. to 200° C. at a rate of 20° C./minute in a nitrogen gas atmosphere having a flow rate of 55 cc/minute.
Perkadox is an organic peroxide manufactured and sold by Akzo Nobel Chemicals Inc.

Polymer compositions 15 and 16 were produced in the manner described in Example 1. Polymer Compositions 17–19 were produced by combining the bitumen emulsion with the fluffy carbon back (CB3) in a pin pelletizer; sufficient extra water was added to produce round uniform pellets having a mean particle size diameter between 1 mm and 2 mm. The wet pellets were then dried in an air circulating oven held at 125° C. until the moisture content of the pellet was reduced to below 0.5%. These pellets were then combined with the other ingredients in the manner described in Example 1. The amounts in the Table 6 reflect the amounts of solid bitumen in the formulation and not emulsion.

After curing, the elongation at break and 100% modulus properties of the polymer compositions were evaluated utilizing the test procedures described above. In coolant hose applications the product of the 100% modulus and the elongation at break is used to predict durability, and a higher figure is desirable. As shown below in Table 7, the values for the polymer compositions of the present invention, Polymer Compositions 15–19, are higher than the control composition, Polymer Composition 14.

TABLE 7

|  | Polymer Comp. 14 | Polymer Comp. 15 | Polymer Comp. 16 | Polymer Comp. 17 | Polymer Comp. 18 | Polymer Comp. 19 |
|---|---|---|---|---|---|---|
| Shore A hardness | 70 | 71 | 72 | 72 | 71 | 71 |
| Eongation @ break × 100% modulus | 1088 | 1169 | 1200 | 1251 | 1145 | 1135 |
| Crescent tear @ 23° C. N/mm | 38.6 | 45.0 | 44.5 | 45.4 | 44.3 | 41.6 |
| Crescent tear @ 100° C N/mm | 12.8 | 15.1 | 18.3 | 16.2 | 19.6 | 13.3 |

The data in Table 7 clearly demonstrates improvements in both tear strength and the composite of elongation @ break and 100% modulus derived from the addition of a bituminous material.

It should be clearly understood that the forms of the present invention herein described are illustrative only and are not intended to limit the scope of the invention.

What is claimed is:

1. A filler composition comprising:

99.9 to 50.0 parts by weight of a filler material;

0.1 to 50.0 parts by weight of a hydrocarbonaceous material having a volatility of less than or equal to 5% after being heated from 25° C. to 20®  C. at 20° C./minute in a nitrogen atmosphere; and, 0.0 to 50 parts by weight of an oil; wherein the hydrocarbonaceous material comprises at least one of: a carbon black feedstock fuel comprising less than or equal to 5%, by weight, sulfur and having a molar hydrogen to carbon ratio between 0.90:1 and 1.10:1; a linear or cyclic condensation product comprising an aromatic alcohol and an aldehyde; or mixtures thereof.

2. The filler composition of claim 1 wherein the hydrocarbonaceous material comprises a carbon black feedstock fuel comprising less than or equal to 5%, by weight, sulfur and having a molar hydrogen to carbon ratio between 0.90:1 and 1.10:1.

3. The filler composition of claim 1 wherein the hydrocarbonaceous material comprises a linear or cyclic condensation product comprising an aromatic alcohol and an aldehyde.

4. The filler composition of claim 3 wherein the aromatic alcohol is present in a molar excess.

5. The filler composition of claim 3 wherein the aromatic alcohol comprises phenol, catechol, resorcinol, or naphthol, and the aldehyde comprises formaldehyde.

6. A filler composition comprising:

99.9 to 50.0 parts by weight of a filler material;

0.1 to 50.0 parts by weight of a hydrocarbonaceous material having a volatility of less than or equal to 5% after being heated from 25° C. to 200° C. at 20° C./minute in a nitrogen atmosphere; and, 0.0 to 50 parts by weight of an oil, wherein the filler material comprises a carbon black having an $I_2$ No. of 10–1500 mg/g; and a DBP of 30–250 cc/100 g.

7. The filler composition of claim 6 wherein the $I_2$ No. of the carbon black is 15–35 mg/g and the DBP of the carbon black is 80–130 cc/100 g.

8. The filler composition of claim 6 wherein the hydrocarbonaceous material comprises at least one of: a bituminous material comprising bitumen, oxidized bitumen, or mixtures thereof; petroleum/oil cracker residue bottoms; a carbon black feedstock fuel comprising less than or equal to 5%, by weight, sulfur and having a molar hydrogen to carbon ratio between 0.90:1 and 1.10:1; a linear or cyclic condensation product comprising an aromatic alcohol and an aldehyde; or mixtures thereof.

9. The filler composition of claim 8 wherein the hydrocarbonaceous material comprises a bituminous material.

10. The filler composition of claim 8 wherein the hydrocarbonaceous material comprises petroleum/oil cracker residue bottoms.

11. The filler composition of claim 10 wherein the petroleum/oil cracker residue bottoms comprise an ethylene cracker residue.

12. The filler composition of claim 8 wherein the hydrocarbonaceous material comprises a carbon black feedstock fuel comprising less than or equal to 5%, by weight, sulfur and having a molar hydrogen to carbon ratio between 0.90:1 and 1.10:1.

13. The filler composition of claim 8 wherein the hydrocarbonaceous material comprises a linear or cyclic condensation product comprising an aromatic alcohol and an aldehyde.

14. The filler composition of claim 13 wherein the aromatic alcohol is present in a molar excess.

15. The filler composition of claim 13 wherein the aromatic alcohol comprises phenol, catechol, resorcinol, or naphthol, and the aldehyde comprises formaldehyde.

16. The filler composition of claim 6 wherein the filler composition comprises 0.5 to 50.0 parts by weight of the hydrocarbonaceous material.

17. The filler composition of claim 16 wherein the filler composition comprises 0.5 to 20.0 parts by weight of the hydrocarbonaceous material.

* * * * *